United States Patent
Hoffberg et al.

(10) Patent No.: US 6,772,124 B2
(45) Date of Patent: Aug. 3, 2004

(54) CONTENT-DRIVEN SPEECH- OR AUDIO-BROWSER

(75) Inventors: Mark B. Hoffberg, Palo Alto, CA (US); Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 85 days.

(21) Appl. No.: 10/288,718

(22) Filed: Nov. 5, 2002

(65) Prior Publication Data

US 2003/0050784 A1 Mar. 13, 2003

Related U.S. Application Data

(63) Continuation of application No. 09/345,339, filed on Jul. 1, 1999, now Pat. No. 6,519,564.

(51) Int. Cl.⁷ ............................................. G10L 21/00
(52) U.S. Cl. .................................................. 704/270.1
(58) Field of Search .............................. 704/270, 270.1, 704/275, 231, 243; 709/217

(56) References Cited

U.S. PATENT DOCUMENTS

| | | | | |
|---|---|---|---|---|
| 6,185,527 B1 | * | 2/2001 | Petkovic et al. | 704/231 |
| 6,243,676 B1 | * | 6/2001 | Witteman | 704/243 |
| 6,311,214 B1 | * | 10/2001 | Rhoads | 709/217 |
| 6,519,564 B1 | * | 2/2003 | Hoffberg et al. | 704/270.1 |

* cited by examiner

*Primary Examiner*—David D. Knepper
(74) *Attorney, Agent, or Firm*—Michael J. Ure

(57) ABSTRACT

The Internet is searched in order to find resources that provide streamable audio such as live Internet broadcasts. The resources are identified based on their file extension and are categorized according to, e.g., the natural language or music style. The user is enabled to browse the collection based on textual or musical input.

10 Claims, 3 Drawing Sheets

CONTENT-DRIVEN SPEECH- OR AUDIO-BROWSER

REFERENCE TO CROSS-RELATED APPLICATIONS

This application is a continuation of application Ser. No. 09/345,339 filed Jul. 1, 1999, incorporated herein by reference, now U.S. Pat. No. 6,519,564.

FIELD OF THE INVENTION

The invention relates in particular to a method for categorizing web sites that provide audio broadcasts over the Internet.

BACKGROUND ART

Currently, nearly 10,000 radio stations broadcast over the Internet. The stations stream their audio content. A streamed file is a file that can be started for playing out before the download is completed. With a proper network connection, decoding and playback software on one's PC or set top box the audio can be captured. Audio output hardware, e.g., analog sound cards, USB speakers, and streaming media tools, such as RealPlayer from RealNetworks, Inc., have become widely available and enable to add the radio functionality to one's PC.

SUMMARY OF THE INVENTION

The user has to check many listings of large numbers of web sites that provide these broadcasts over the Internet. Accordingly, there is a need for helping the user to select from among the huge number of stations available. To this end, the invention provides a method for categorizing web sites or resources on the Internet that provide audio (e.g., speech and music) streaming based on their typical content. A web resource that provides audio streaming is identified by its resource type. The resource type is determined by way of the type extension in its URL that indicates the file format, e.g., ".ram", ".tsp" or ".swa". This extension enables, for example, to automatically open the proper software applications (or "plug-ins") in the user's browser when the hyperlink is clicked. Accordingly, the relevant resources on the Internet can be identified based on their URL. If the file extension is not available through the URL, the resource type is determined by the MIME type or content-type information provided in the HTTP header of the resource. Taking into consideration the resource's country domain extension, e.g., ".nl" for the Netherlands or ".ru" for Russia, further optimizes the analysis of the URL, for example if one is interested in audio content in a specific natural language. Upon finding a relevant resource, i.e., one that provides streaming of audio, the resource's file is retrieved from the relevant server and analyzed based on its audio content. In a preferred embodiment, the inventor proposes to use speech recognition or music (tune/rhythm) recognition software to search through and categorize these stations by, e.g., language, style of music, absence of commercials. Speech recognition software is capable of determining the signature of various kinds of music, thus allowing categorization of music with just this kind of software. For example, classical music has typically a different speech recognition signature than rock music. A server can be dedicated to categorize stations or channels in a data base, similar as to what PlanetSearch or Altavista does for text documents. One or more web crawlers can be used in parallel to automatically fetch web sites that supply audio so as to identify them for a search engine. Additionally, the resource's server can be evaluated by the crawler for the quality of the connection, e.g., connection speed, reliability, etc. For example, the categorizing server may recommend to a user, who has broadband network access (e.g., ISDB, cable, T1), higher connection speed sources. An audio browser is provided, analogous to PlanetSearch's or Alta Vista's for text, to provide a searchable collection of Internet audio web sites based from which specific pages are returned to the user based on certain audio search criteria. Alternatively, the catalog approach (Yahoo experts hand-pick and assign sites to categories) can be taken to categorize the stations at the server and make them accessible through a search engine. Once the sites are categorized, a user provides a query input to the server and receives a list of URLs representative of the channels that match the query input (e.g., give me a French language station that plays music like this). As an alternative or supporting this, the server provides a customized electronic program guide to the user based on a profile of the user stored on the server, e.g., using the SmartConnect infrastructure of Philips Electronics.

The invention is of commercial interest in particular to, e.g., cable providers and network owners, and service providers in order to serve as an incentive for subscribers.

As to music recognition, see, for example U.S. Ser. No. 08/840,356 filed Apr. 28, 1997 or Mark Hoffberg for BIBLIOGRAPHIC MUSIC DATA BASE WITH NORMALIZED MUSICAL THEMES, now allowed and herein incorporated by reference. This patent document discusses, among other things, how rhythm information or tonal information of a musical theme can be used to identify the theme. The rhythm information comprises the time signature (meter) and the accentuations of the theme. The time signature determines the number of beats to the measure. The accentuation determines which beat gets an accent and which one does not. For example, the sign $^6_8$ in a musical score is the time signature indicating that the meter is 6 beats to the measure and that an eighth note gets one beat. Flamenco music has a variety of different styles, each determined by its own compàs (rhythmic accentuation pattern). Typical examples of flamenco music are Alegrias, Bulerìas, Siguiriyas and Soleares that all have 12 beats to the measure. In the Alegrias, Bulerìas and Soleares, the third, sixth, eighth, tenth and twelfth beats are accentuated. The first, third, fifth, eighth and eleventh beats are emphasized in the Siguiriyas style. In this system rhythmic accentuation patterns are used as input data in order to retrieve bibliographic information associated with the theme that is represented by the rhythm. For example, the rhythmic accentuation pattern is entered into the system as a substantially monotonic sequence of accentuated and unaccentuated sounds. The input data then is represented by, e.g., a sequence of beats or peaks of varying height in the time domain. The relative distances between successive peaks represent the temporal aspects of the pattern and the relative heights represent the accentuations in the pattern. The sequence of beats and rests in between is represented by a digital word. The words can be stored lexicographically to enable a fast and orderly retrieval. If tonal information and/or rhythm information can be used to identify individual musical themes, they can also be used to identify with more or less accuracy a certain style of music.

As to SmartConnect, see, for example U.S. Ser. No. 09/160,490 filed Sep. 25, 1998 for Adrian Turner et al., for CUSTOMIZED UPGRADING OF INTERNET-ENABLED DEVICES BASED ON USER-PROFILE, herein incorporated by reference. This document relates to a server system that maintains a user profile of a particular end-user of consumer electronics network-enabled equipment and a data base of new technical features for this type of equipment, e.g., a home network. If there is a match between the user-profile and a new technical feature, and the user has indicates to prefer receiving information about updates or sales offers, the user gets notified via the network of the option to obtain the feature.

As to SmartConnect, also see U.S. Ser. No. 09/189,535 filed Nov. 10, 1998 for Yevgeniy Shteyn for UPGRADING OF SYNERGETIC ASPECTS OF HOME NETWORKS, herein incorporated by reference. This document relates to a system with a server that has access to an inventory of devices and capabilities on a user's home network. The inventory is, for example, a look-up service as provided by HAVi, JINI and Home API architectures. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
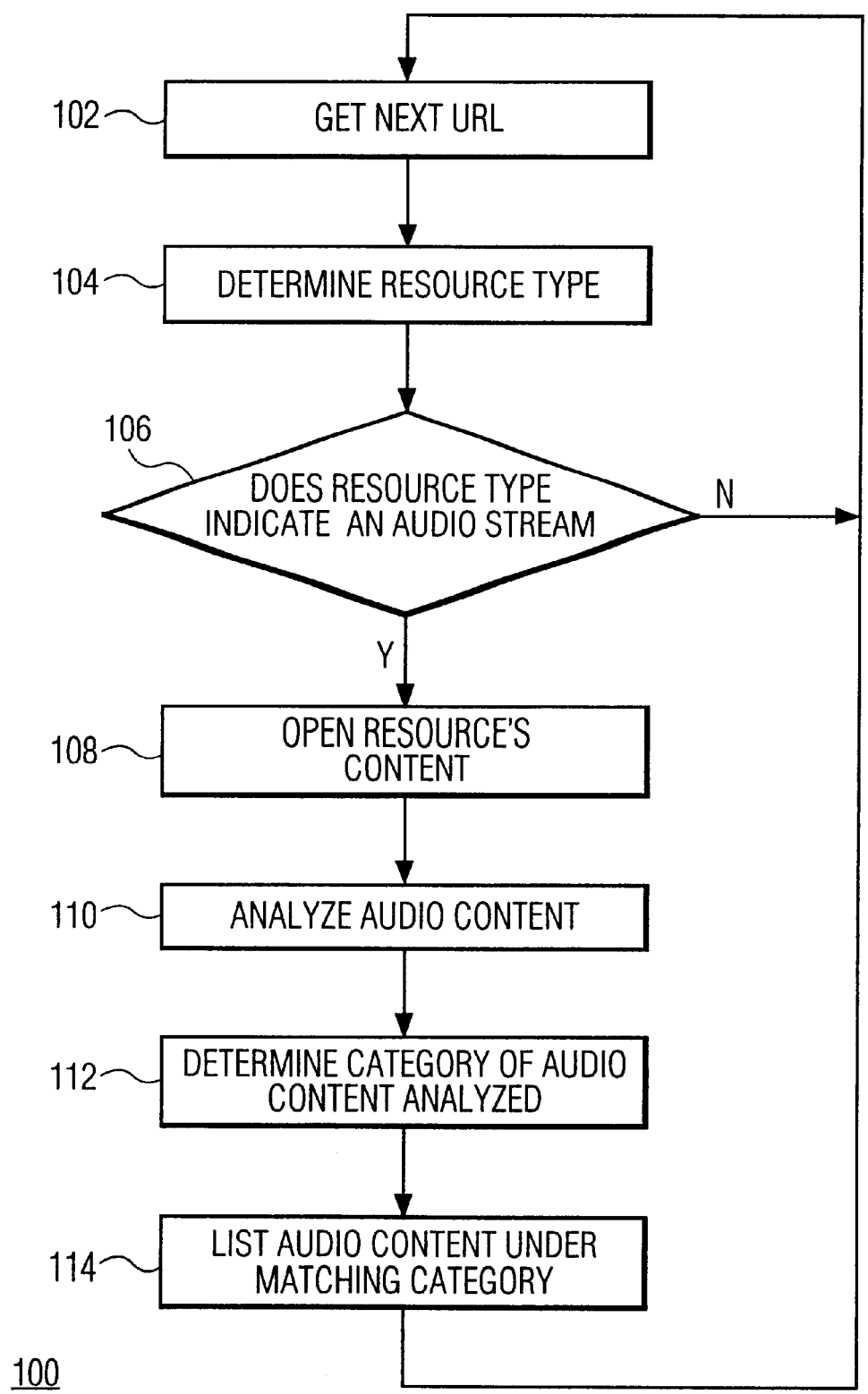
FIG. 1 is a flow diagram illustrating a method in the invention.

FIG. 1 is a flow diagram 100 with the main steps in a method according to the invention. In step 102, a first, or the next, web resource is identified based on its URL. The resource type of the current URL is determined in step 104 to find out in step 106 if the resource has an audio streaming format. For example, in step 106 the URL is checked for the presence of a file extension that indicates streamable audio. If the URL does not have such a file extension, the resource is opened and the resource type is extracted, e.g., content type information or MIME type information is extracted from the HTTP header of the resource. If the resource does have a resource type that is compatible with an audio streaming format the resource is retrieved in step 108. If it does not have a streaming format the process returns to step 102 to get the next URL. In step 110, the audio content of the resource opened in step 108 is analyzed based on its audio content. For example, the rhythm signature is used to determine the style of a musical theme, or the language of an oral presentation is determined through speech recognition in step 112 in order to assign the resource to a specific category in step 114. A web site thus identified is preferably visited a number of times in order to get a statistically relevant average profile for a more accurate indexing under a specific category or for automatically determining a category by clustering resources with a similar profile. This may especially be relevant to sites that provide live radio broadcasts. The so-called web-crawler or spider technology can be used for scanning the relevant sites and feeding them to a dedicated search engine that performs the content analysis.

Figure 2:
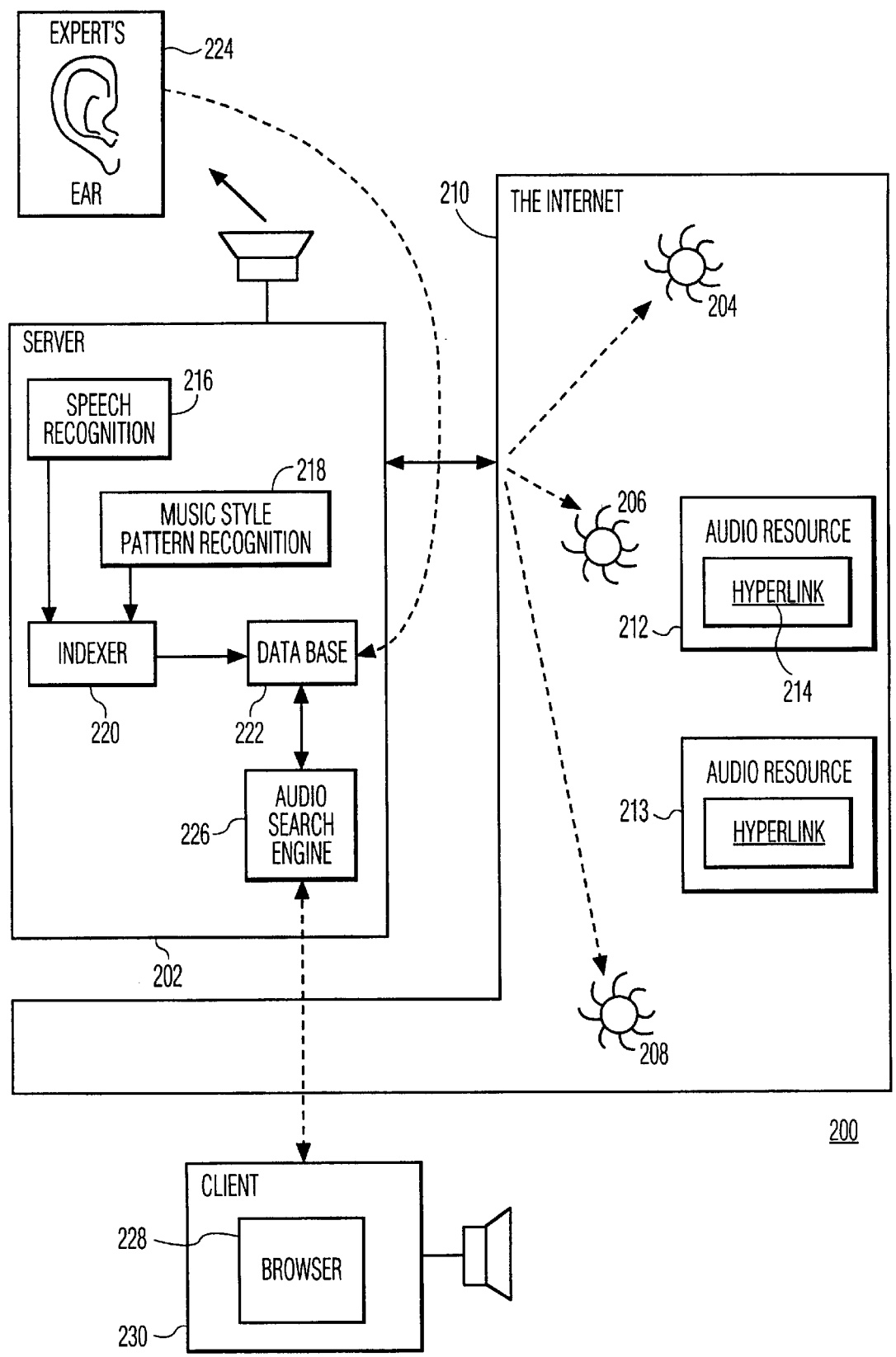
FIG. 2 is a block diagram of a system for use in the invention.

FIG. 2 illustrates this in more detail with reference to a block diagram of a system 200. System 200 comprises a dedicated server 202 that sends out multiple spiders 204, 206, . . . , 208 over the Internet 210 to visit Web sites. As known, a spider, also referred to as a "web crawler", is a software program that fetches Web pages and analyzes their content in order to generate searchable, indexed catalogs for a search engine. Web sites and specific pages can be visited and indexed selectively. A typical Web page includes one or more hyperlinks to other Web pages. Therefore, a spider can start almost from anywhere and hop from Web page to Web page following the links it encounters while being out there on the Internet. Each of spiders 204–208 visits HTML pages and scans it for clickable links that indicate the presence of resources for streamable audio. In this sense, an audio spider, i.e., the entity that specifically looks for audio links, may ride piggyback with a conventional spider or crawler that scans text-based information. Currently, popular formats for streaming audio include RealAudio (file extension ".ram") from RealNetworks, Inc., TrueSpeech (file extension ".tsp") from DSP Group, Inc., and Macromedia's Shockwave for Director (file extension ".swa"). Links that have these extensions are relevant to spiders 204–208.

Once a spider, e.g., spider 206, has identified a resource 212 (based on its hyperlink 214) that provides audio streaming, it fetches the data and causes the content to be analyzed, e.g., by server 202, based on the content's pattern. The content's pattern is analyzed using, for example, automated speech recognition methods 216, or automated music pattern or rhythmic pattern analysis 218 as discussed above. Based on the results of this analysis, the content is indexed by an indexer 220 in a data base 222 as relating to a certain natural language, one or more music styles. Alternatively, or subsidiarily, human experts 224 listen to the content associated by the links thus identified by the spiders and categorize the audio by hand in data base 222. As a side remark, note that the number of audio sites on the Internet is large but not as nearly as large as the number of textual and/or graphics sites by many orders of magnitude. Accordingly, it pays off to have the audio links scanned or data base 222 reviewed by human experts. Server 202 provides a search engine 226 to search data base 222 for specific concepts requested by a user via his/her client 228 that has a browser 230. For example, the user requests audio sites that supply a live radio broadcast in the Spanish language. The user submits his/her request that has the terms "live" and "Spanish" (or the Spanish equivalent thereof) in it. Sites that provide Spanish spoken programs are recognized by their language, e.g., via speech recognition 216. Sites that provide a live broadcast are recognized as such by experts 224, or may be automatically identified by listening in on the repeated mentioning throughout the day and at certain regular time intervals of the date and time, as is the case with most news services. Alternatively or subsidiarily, the meta tags associated with the HTML pages containing the audio hyperlinks or associated with the audio pages themselves contain the expression "live" (or the equivalent in another language). The cross section of the set of audio sites that provide "live" broadcasts with the set of audio sites that provide audio comprising Spanish language is the set wherein the requester is interested. Similarly, if the user is interested in audio streaming of a certain piece of music, he or she may provide the input in a format as disclosed in U.S. Ser. No. 08/840,356 of the same inventor, now allowed and discussed above, to determine if there is a matching resource available on the Internet. If the user is interested in sites that supply a certain style of music, he or she may submit a request to search engine 226 in a textual format, such as: "get me the sites that provide French chansons from the fifties". The relevant terms here are: "French", "chansons" and "fifties" based on which data base 222 is queried. Whether or not a certain chanson is from the time period indicated could have been added as an entry to data base 222 by experts 224. Alternatively, or as an additional support the music data base discussed in U.S. Ser. No. 08/840,356 is used to intervene and to convert the user's request into a request for specific music titles queried in the manner specified.

Figure 3:
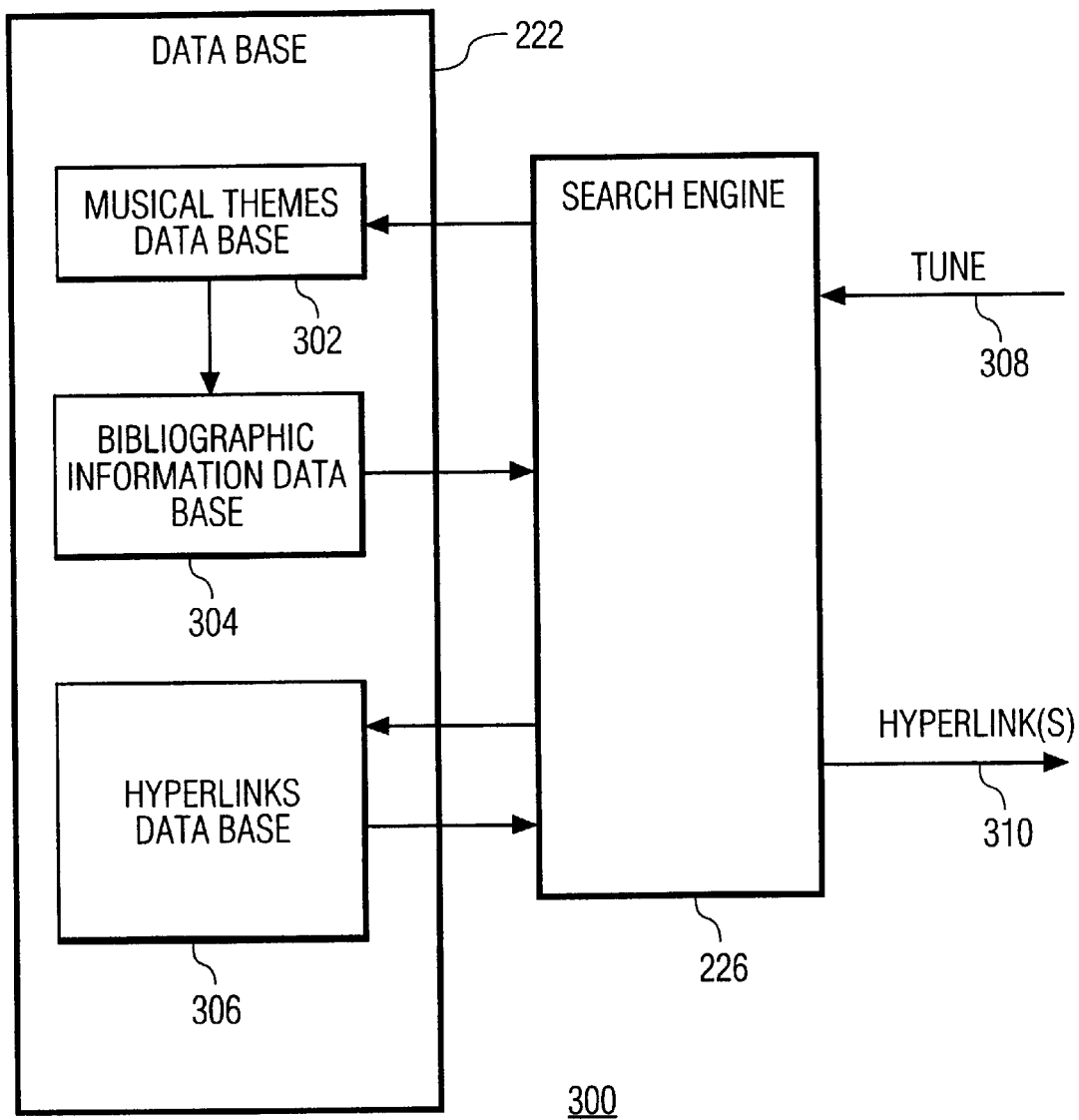
FIG. 3 is a block diagram of part of the system of FIG. 2.

FIG. 3 is a block diagram of a part 300 of system 200. In this example data base 222 is comprised of first, second and third portions 302, 304 and 306, respectively. Portion 302 comprises a musical themes data base, wherein musical themes (sequence of notes, rhythmic signature, etc) are stored. Portion 304 stores bibliographic information items associated with musical themes in portion 302. Portion 306 stores a data base with hyperlinks associated with Internet resources that provide audio. The user supplies to search engine 226 a certain tune or beat pattern at input 308. This input information is supplied to data base portion 302 to determine if there is a match between the musical information supplied by the user and one or more themes stored in portion 302. Upon finding one or more matches, the corresponding bibliographic information items are retrieved, optionally for display to the user. The bibliographic information items enable running a query in the audio documents indexed in data base portion 306. Upon finding one or more matches, the search engine returns to the user at an output 310 the corresponding hyperlinks.

What is claimed is:

1. A method of enabling locating at least a specific one of multiple hyperlinks that enable access to streamable audio contents, the locating comprising:

enabling supplying input information respecting a plurality of specific audio contents to a search engine;

enabling the search engine to query, based on the input information supplied, a searchable data base consisting of sets of information associated with the streamable audio contents;

if the search engine finds one or more sets of information matching the input information, providing at least one hyperlink linking to at least one of the specific audio contents, the hyperlink being associated with one of the matching sets of information.

2. The method of claim 1, wherein the input information and each set of information comprise an artist name.

3. The method of claim 1, wherein the input information and each set of information comprise a music style.

4. The method of claim 1, wherein the input information comprises at least a keyword associated with the specific audio contents.

5. The method of claim 1, wherein the sets of information comprise at least one keywords associated with the streamable audio contents.

6. The method of claim 1, wherein the specific audio contents are respective songs.

7. A method of enabling to identify a specific one of multiple sources on the Internet that enable access to at least one respective streamable audio content, the enabling comprising:

providing a searchable data base consisting of sets of information associated with the sources, each source being indexed based on an analyzing of the at least one audio document, to which the source enables access, based on predetermined criteria;

providing a search engine for querying the data base upon a user having submitted a query item; and providing at least one hyperlink linking to the source upon the search engine finding a match between the query item and the data base.

8. The method of claim 7, wherein the source is a Web server.

9. The method of claim 7, wherein the source is an Internet radio.

10. A software application comprising computer readable instructions for performing the following:

enabling identifying a specific one of multiple sources on the Internet that enable access to at least one respective streamable audio content;

providing a searchable data base consisting of sets of information associated with the sources, each source being indexed based on an analyzing of the at least one audio document, to which the source enables access, based on predetermined criteria;

providing a search engine for querying the data base upon a user having submitted a query item; and providing at least one hyperlink linking to the source upon the search engine finding a match between the query item and the data base.

* * * * *